(12) United States Patent
Inoue

(10) Patent No.: US 6,215,868 B1
(45) Date of Patent: Apr. 10, 2001

(54) CONNECTION APPARATUS FOR CONNECTING A DIGITAL OR ANALOG SUBSCRIBER LINE OF COMMUNICATION NETWORK TO COMMUNICATION DEVICE

(75) Inventor: Yutaka Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/035,492

(22) Filed: Mar. 5, 1998

(30) Foreign Application Priority Data

Mar. 7, 1997  (JP) .................................................... 9-053132

(51) Int. Cl.[7] ...................................................... H04M 1/00
(52) U.S. Cl. .................... 379/387; 379/93.03; 379/93.14
(58) Field of Search ................................... 379/387, 395, 379/93.03, 93.14

(56) References Cited

U.S. PATENT DOCUMENTS

| 5,410,539 | 4/1995 | Ikeno . | |
|---|---|---|---|
| 5,475,744 | 12/1995 | Ikeda . | |
| 5,598,401 | * 1/1997 | Blackwell et al. | 370/385 |
| 5,696,817 | 12/1997 | Yatsu . | |
| 5,838,785 | * 11/1998 | Hirata | 379/395 |
| 5,857,017 | 1/1999 | Ohi et al. | 379/157 |
| 6,055,245 | * 4/2000 | Mitchell et al. | 379/418 X |

FOREIGN PATENT DOCUMENTS

| 0 489 645 | 6/1992 | (EP) . |
| 4-150546 | 5/1992 | (JP) . |
| 4-233647 | 8/1992 | (JP) . |
| 5-145638 | 6/1993 | (JP) . |
| 06338948 | 12/1994 | (JP) . |

OTHER PUBLICATIONS

U.S. application No. 07/802284.Patent # 5838785.
Subscriber line signal method and realization device of "Outgoing phone number display service", Kiyosumi Kobayashi et al., NTT Technical Journal, NTT, Nov. 1996, vol. 8 No. 11, pp. 18–21.

\* cited by examiner

*Primary Examiner*—Creighton Smith
(74) *Attorney, Agent, or Firm*—Morgan & Finnegan, LLP

(57) ABSTRACT

A terminal adapter or a private branch exchange modulates a calling party number received from a digital subscriber line and sends a modulated signal to an analog terminal in the OFF period of a ringing signal or before the ringing signal is sent.

38 Claims, 11 Drawing Sheets

CONNECTION APPARATUS FOR CONNECTING A DIGITAL OR ANALOG SUBSCRIBER LINE OF COMMUNICATION NETWORK TO COMMUNICATION DEVICE

BACKGROUND OF THE INVENTION

1. Field of the Invention

The present invention relates to a connection apparatus for connecting a digital or analog subscriber line of a communication network to a communication device of a subscriber.

2. Description of the Related Art

When a subscriber of a digital communication network such as an ISDN wants to connect his/her analog communication device to the digital communication network, the analog communication terminal must be connected to the subscriber line of the digital communication network through a terminal adapter (TA).

The TA has, as an interface to a personal computer, a digital port such as RS-232C, a digital port (S/T point interface in an ISDN) for connecting a digital device such as a digital telephone, and an analog port (modular jack) for connecting a conventional analog telephone or G3-FAX. Some TAs have a plurality of analog ports. With the use of TA, two arbitrary types of communication/speech communication selected from personal computer communication, digital telephone, analog telephone, FAX, and the like can be performed through an ISDN.

FIG. 1 shows the connection form of a general TA. Reference numeral 100 denotes a TA for transmitting/receiving data/speech data to/from a digital communication line such as an ISDN via a line interface; 102, a digital port connected to a personal computer; 103, a digital port connected to a digital communication device such as a digital telephone; 104, an analog port connected to an analog telephone or FAX; and 105, an analog port like the analog port 104. In this example, the TA has two analog ports.

In the arrangement shown in FIG. 1, when the digital line is used, the communication rate of personal computer communication can be raised, and additionally, a telephone or FAX can be used while performing personal computer communication.

The TA shown in FIG. 1 is connected to one ISDN line having two communication channels. Some private branch exchanges (including key telephones) allow 2×n terminals to simultaneously communicate by connecting a plurality of (n) ISDN lines.

Some other private branch exchanges are connected to both a digital line such as an ISDN line and an analog line.

One of the convenient functions of such communication is a calling party number notification (caller ID) function. Upon reception of an incoming call, this function serves to notify the called party of the telephone number of the caller and is effectively used to avoid unwanted calls.

The ISDN as a digital network has long supported this calling party number notification function. For example, the INS 64 service of NTT is providing this function free. Most digital devices such as a digital telephone that are connected to the ISDN are compatible with this function. These devices include displays such as LCDs (liquid crystal displays) and have functions of displaying the calling party number upon reception of an incoming call and storing this calling party number to use as data for redialing.

The PSTN (Public Switched Telephone Network) as an analog network is already providing this service in USA, Canada, or England. Even in Japan, this service is planned to start soon, and analog telephones for PSTN are being developed.

However, although the above-described general TA or private branch exchange has an analog port for connecting an analog device, the analog device connected to the analog port is not notified of the calling party number.

For this reason, even when an analog device having an existing calling party number notification function is connected, this function is wasteful, and the existing resource cannot be effectively used.

Conversely, even when a PSTN line as an analog line and an ISDN terminal as a digital terminal are connected to a private branch exchange, the ISDN terminal is not notified of the calling party number which has been notified from the PSTN line upon reception of an incoming call.

SUMMARY OF THE INVENTION

It is an object of the present invention to notify an analog terminal of information which has been notified from a digital subscriber line using a digital signal.

It is another object of the present invention to notify a digital terminal of information which has been notified from an analog subscriber line using an analog signal.

Alternatively, a digital signal is received from a digital subscriber line, and an analog signal converted from the received digital signal is sent to a communication device in a procedure of calling the communication device.

In the present invention, an analog signal is received from an analog subscriber line, and a digital signal corresponding to the analog signal received from the analog subscriber line is sent to the communication device in a procedure of calling the communication device.

According to the present invention, there is provided an information sending method for an analog terminal connection apparatus which sends, to an analog terminal having a function of receiving an analog signal modulated according to the calling party number from the network upon reception of an incoming call, the analog signal modulated according to information corresponding to the analog terminal and a ringing signal in place of the calling party number.

According to the present invention, there is also provided an analog terminal connection apparatus for connecting an analog terminal having a function of receiving an analog signal modulated according to the calling party number upon reception of an incoming call, comprising modulated signal sending means for sending, to the analog terminal, an analog signal modulated according to information corresponding to the analog terminal in place of the calling party number, and ringing signal sending means for sending a ringing signal to the analog terminal, or a storage medium which stores a control program for the analog terminal connection apparatus.

The analog modulated signal is sent, e.g., during the OFF period of the ringing signal which is intermittently sent, or before the ringing signal is sent.

According to the present invention, there is also provided an analog terminal connection method comprising inserting, in place of a calling party number, information corresponding to a digital terminal to the position of the calling party number contained in a call reception request code to be sent to the digital terminal and sending the call reception request code to the digital terminal.

According to the present invention, there is also provided a digital terminal connection apparatus comprising call reception request code generation means for inserting, in place of a calling party number, information corresponding to a digital terminal to the position of the calling party number contained in a call reception request code to be sent to the digital terminal, and sending the call reception request code to the digital terminal, or a storage medium which stores a control program for the digital terminal connection apparatus.

The information corresponding to the analog or digital terminal means information unique to the analog or digital terminal (more specifically, information of the connected terminal or extension number). Alternatively, it is information representing the use result or record of the analog or digital terminal (more specifically, communication charge information or communication time information) or, e.g., limitation information (more specifically, destination limitation information, user limitation information, or call limitation upon reception of an incoming call). The call limitation upon reception of an incoming call is information representing whether the terminal is to be called or not depending on the calling party or called party information or information such as a communication attribute detected upon reception of an incoming call. In other words, it is information representing whether the terminal is to be called upon reception of an incoming call, which is set in advance.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

Figure 1:
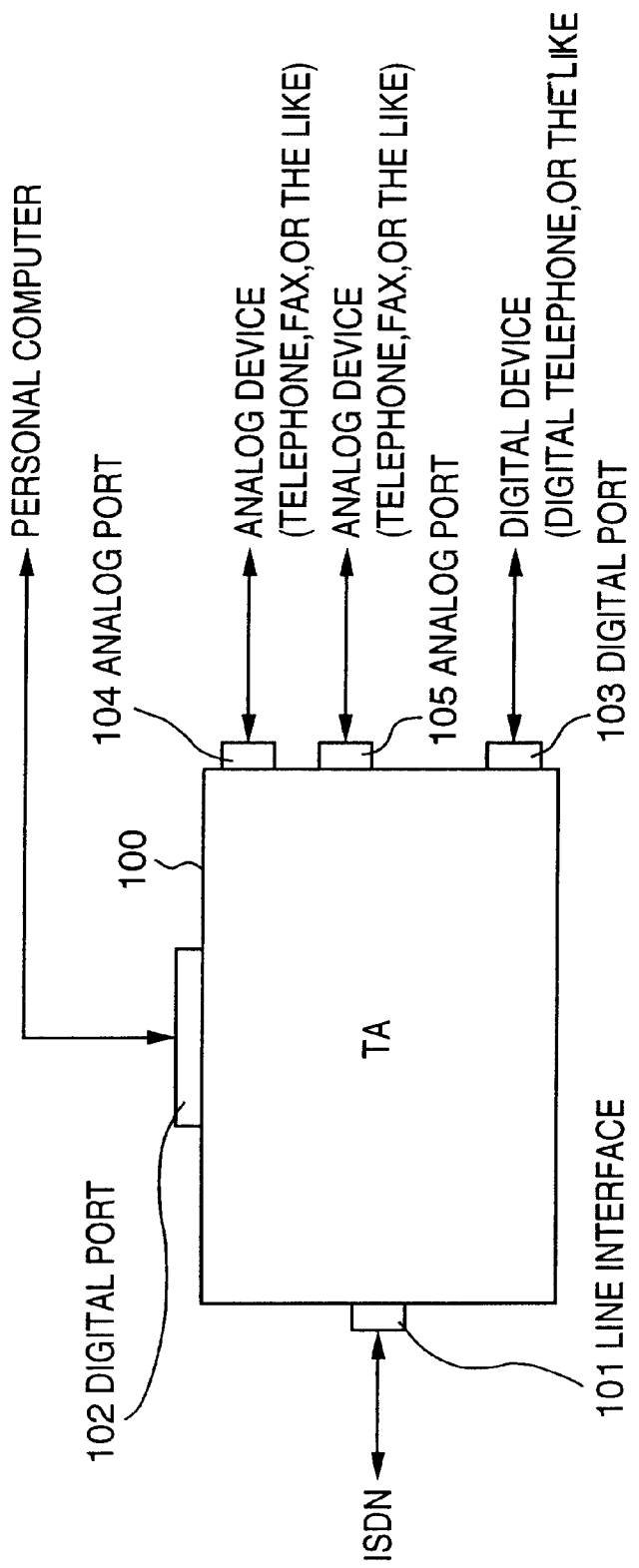
FIG. 1 is a view showing the arrangement of a conventional TA.
Figure 2:
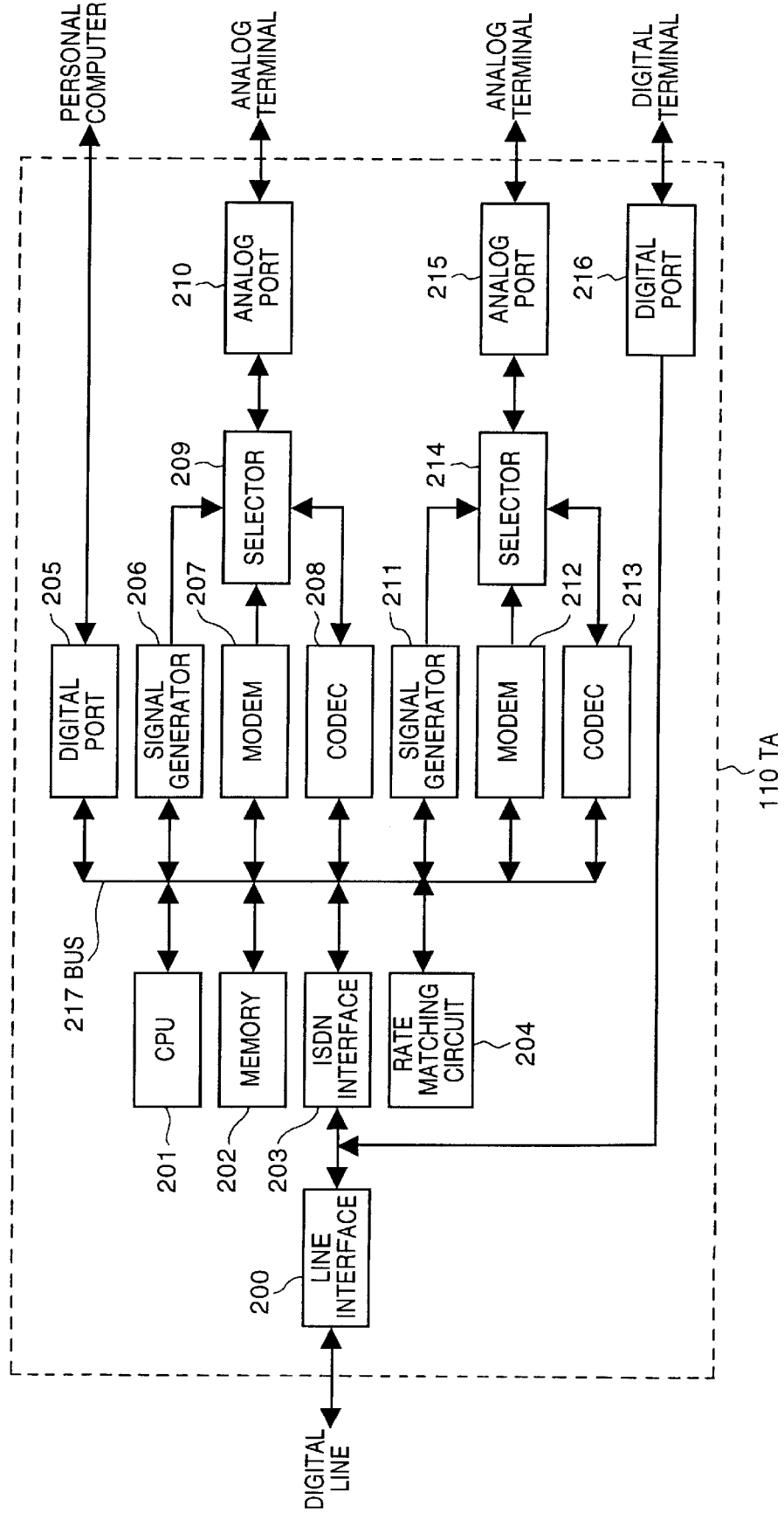
FIG. 2 is a block diagram showing the internal arrangement of a TA which practices the present invention.

FIG. 2 shows the arrangement of a terminal adapter 110 which practices the present invention. The embodiment of the present invention will be described below in detail with reference to the accompanying drawings.

Reference numeral 200 denotes a line interface constituted by a transducer, a connector, and the like and used to receive data from a subscriber line of a digital communication network such as an ISDN. This line interface 200 is connected to an ISDN interface 203 which processes control data on the line. This ISDN interface 203 is connected to a bus 217. The bus 217 is connected to a CPU 201, i.e., the central processing unit for controlling the apparatus, a memory 202 for storing data and programs, a rate matching circuit 204 for matching the digital line data rate and data rate at each port of the TA 110, a digital port 205 for connecting the apparatus to a digital device such as a PC, a signal generator 206 connected to the analog device of the subscriber, e.g., an analog telephone, through a selector 209 and an analog port 210 to generate a signal to be sent to the analog terminal, a modem 207 for generating a modulated signal to be sent to the analog terminal, and a codec 208 for coding/decoding speech/data sent/received to/from the analog terminal.

The line interface 200 is also connected to a digital port 216 to connect a digital terminal such as a digital telephone.

A signal generator 211, a modem 212, a codec 213, a selector 214, and an analog port 215 are the same as those for the analog port 210, which are inserted between the analog port 210 and the bus 217. In this embodiment, the TA has two analog ports. However, the present invention can be applied not only to the TA having two analog ports but also to an apparatus having one or three or more analog ports. This also applies to the number of digital ports. Only one of the digital ports 205 and 216 may be arranged, and neither a PC nor a digital device need be connected.

Operations in various connection forms will be described next.

First, the operation in PC communication will be described.

If it is determined on the basis of control data received through the line interface 200 and the ISDN interface 203 that the data received from the ISDN is data of PC communication, the CPU 201 outputs the received data to the digital port 205 such as RS-232S or centronics through the bus 217. For the ISDN line, this determination can be made on the basis of data of, e.g., the transfer capability and communication type such as a communication class contained in the call reception request control signal.

In some cases, the data received from the ISDN interface 203 is subjected to rate control 204 (e.g., ITU-T recommendation; V.110 function) to match the line-side communication rate (e.g., 64 kbps) with the PC-side communication rate (e.g., 19.2 kbps) and then output to the digital port 205. Matching with the data format (e.g., HDLC format) on the line may sometimes be necessary, although it is not illustrated. In this case, format conversion processing (e.g., asynchronous-synchronous PPP (Point to Point Protocol) conversion) must be performed.

Data transmission from the PC is performed along the reverse path following the same procedure as described above. At this time, the calling party number of the digital terminal can be sent using the normal ISDN service.

The calling party number received (signaled) by the ISDN using the control signal in the PC communication may be directly transferred to the PC. Otherwise, a number is set in the TA (memory 202) and compared with the received calling party number. The comparison result is reflected on call reception control for determining whether the PC is to be called.

Communication operation using a digital terminal will be described next.

Data/speech received from the ISDN is received through the line interface 200 and directly output to the digital port 216. The digital terminal is a terminal directly connected to the digital line, e.g., a digital telephone. The digital terminal incorporates the same circuit as the ISDN interface 203 in the TA 110 so the digital port 216 is directly connected to the line interface 200.

Data/speech transmission to the ISDN is performed through the reverse path. At this time, the calling party number of the digital terminal can be sent using the normal ISDN service.

Communication operation using an analog terminal will be described next.

The operation will be described in detail with reference to the flow chart in FIG. 3. The flow chart in FIG. 3 explains a program stored in the memory 202. The CPU 201 operates according to this program.

In communication using an analog terminal, the signal generators 206 and 211 for sending a dial tone, a ring-back tone, a busy tone, and a ringing signal to the analog terminal, the modems 207 and 212 for sending the calling party number to the analog terminal, the codecs 208 and 213 for converting the speech/data (analog signal) at the analog terminal into a digital signal on the line or vice versa, and the selectors 209 and 214 for selecting connections between the above devices and the analog ports 210 and 215 are used.

The TA of this embodiment has two analog ports. The operation and arrangement between one analog port and the TA 110 are the same as those for the other analog port, and the operation between one analog port and the TA (more specifically, operation performed when the analog port 210 is used) will be described.

Incoming call (call reception) will be described first. Procedures of transferring the calling party number using an analog signal are roughly classified into a procedure of inserting the calling party number in the OFF period of the ringing signal and a procedure of transferring the calling party number prior to the ringing signal. A procedure corresponding to the analog terminal is selected and used. FIG. 3 is a flow chart showing the operation of the TA 110 upon reception of an incoming call.

First, it is checked whether a call reception request has been received from the network side (Step 1). More specifically, processing waits for a call reception request control code from the network (more specifically, in the ISDN, processing waits for reception of a call reception request code (setup code) from the network through a control channel (D channel)). The actually received call reception request code is sent to the memory 202 through the ISDN interface 203 and bus 217 or to the CPU 201 directly. The CPU 201 interprets the received code and determines whether the code is a call reception request code.

This call reception request code contains the calling party number (number of the caller) and the called party number together with data of transfer capability for indicating whether the data is speech data or digital data and communication class for discriminating "telephone", "FAX", and the like.

If YES in Step 1, the flow advances to the next step (Step 2). The CPU 201 determines on the basis of the transfer capability, communication class, and calling and called party numbers whether the received call is addressed to an analog port. More specifically, if the transfer capability indicates speech data, and the communication class is "telephone", connection to an analog port (e.g., 210) to which a telephone is connected is determined. If the transfer capability indicates 3.1-kHz audio data, and the communication class is "G2/G3-FAX", connection to an analog port (e.g., 215) to which a FAX is connected is determined. The types of terminals connected to the analog ports are stored in the memory 202 in advance. Alternatively, when independent called party numbers (including subaddresses) are assigned to the digital/analog ports and registered in the memory 202 in advance, a call addressed to an analog port can be determined on the basis of the called party number added to the call reception request.

If connection to a digital port is determined, the flow advances to Step 10.

If connection to an analog port is determined, the flow advances to the next step (Step 3), and the TA 110 sends a ringing signal to the analog terminal. For a normal analog line, the ringing signal is sent from the exchange system on the network side. In a digital network such as an ISDN, the ringing signal is not received, so a pseudo ringing signal must be generated in the TA 110. The signal generator 206 generates this ringing signal. The CPU 201 instructs the signal generator 206 to generate a ringing signal and controls the selector 209 to output the ringing signal to the designated analog port. This ringing signal has a frequency defined with a cycle of, e.g., 1-sec ON and 2-sec OFF and is used to generate a ring-back tone for the telephone.

Figure 4:
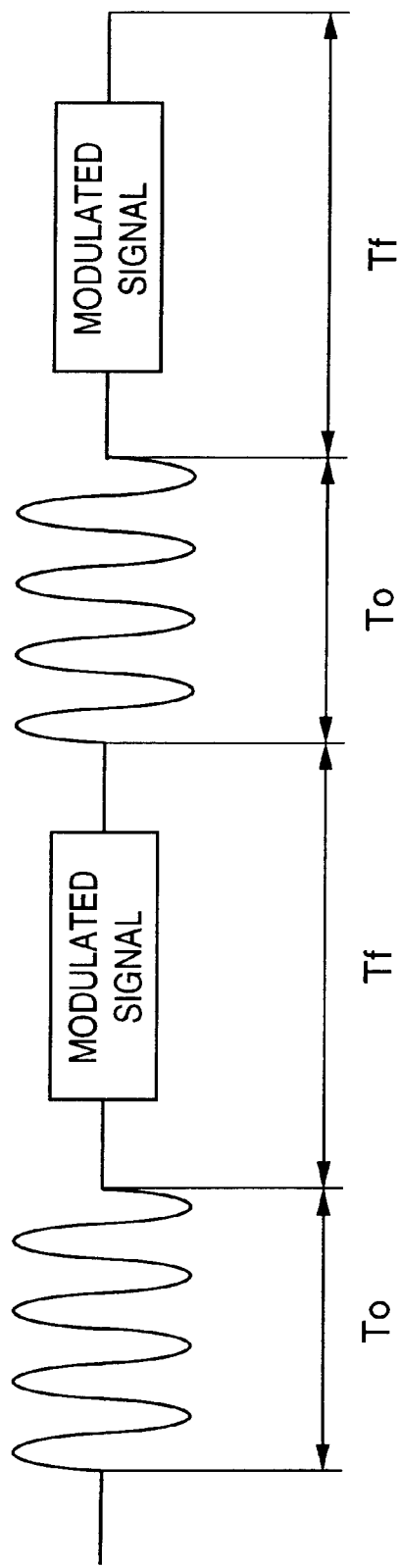
FIG. 4 is a view of a first ringing signal for notifying a calling party number.

In this example, calling party number notification can be realized by inserting a waveform obtained by modulating the calling party number in the OFF period of the ringing signal. FIG. 4 shows the ringing signal and the modulated signal of the calling party number. In FIG. 4, To indicates the ON period of the ringing signal, and Tf indicates the OFF period of the ringing signal. The modulated signal (the modulated signal is obtained by modulation based on, e.g., ITU-T recommendation V.23) of the calling party number transferred together with the setup signal is inserted in the period Tf by the modem 207, as shown in FIG. 4. An analog terminal (e.g., an analog telephone) connected to each analog port and supporting the calling party number notification function called, e.g., CND (Calling party Number Delivery), has a modem for demodulating the modulated signal and therefore can obtain the calling party number from the demodulated signal.

The CPU 201 of the TA 110 continuously alternately outputs the ringing signal and the modulated signal in which the calling party number (calling party number contained in the call reception request code received from the ISDN) is inserted as shown in FIG. 4 until the analog telephone becomes idle (goes off-hook). More specifically, the signal generator 206, the modem 207, and the selector 209 are controlled such that the ringing signal from the digital port 205 and the modulated signal from the modem 207 are switched by the selector 209 and alternately output.

If it is determined that the analog terminal has gone off-hook (the analog terminal has responded to the ringing signal), the flow advances to the next step (Step 6), and the CPU 201 starts actual speech/data communication. Determination of the off-hook state is made by the CPU 201 on the basis of the output from the analog port 210. In this case, the codec 208 is used to convert the digital speech/data on the line into analog speech/data or vice versa. More specifically, the CPU 201 controls the selector 209 to connect the codec 208 to the analog port 210. The codec 208 comprises, e.g., a PCM (Pulse Code Modulation) codec (coder/decoder) for performing conversion between analog speech/data and digital speech/data.

Simultaneously, a response signal is sent to the network to connect the analog terminal to the caller.

With the above operation, normal speech communication is enabled (Step 7). Upon detecting completion of this speech communication (Step 8) from the on-hook state or the like, the speech communication is terminated.

Figure 9:
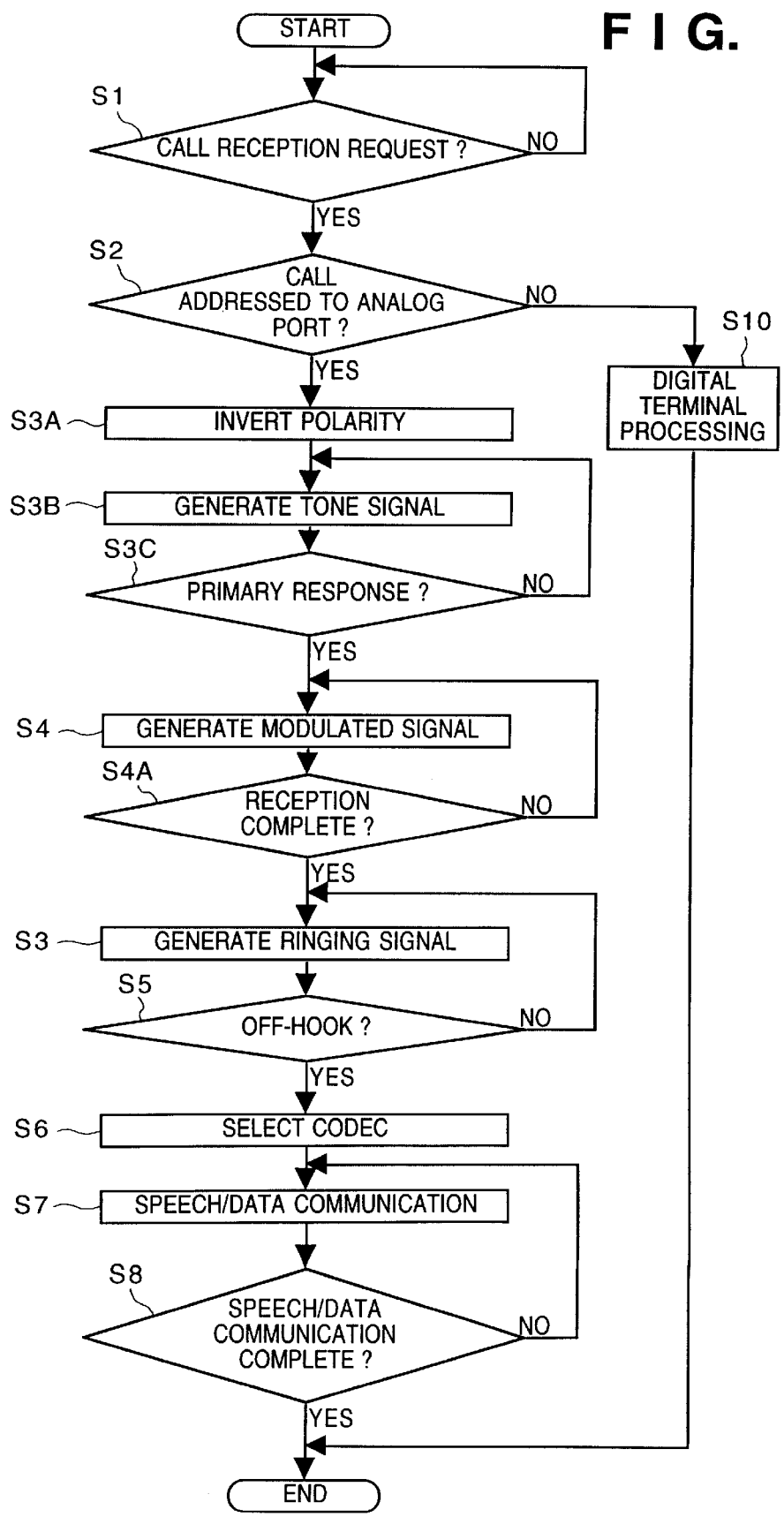
FIG. 9 is a flow chart showing the first operation of the TA which practices the present invention.

An example in which the calling party number is transferred to an analog terminal supporting the procedure of transferring the calling party number prior to the ringing signal will be described next with reference to the flow chart shown in FIG. 9. FIG. 9 is a flow chart for explaining a program stored in the memory 202. The CPU 201 operates according to this program. The memory 202 may store both programs shown in FIGS. 3 and 9 such that one of them can be selected, or may store one of these programs.

Figure 3:
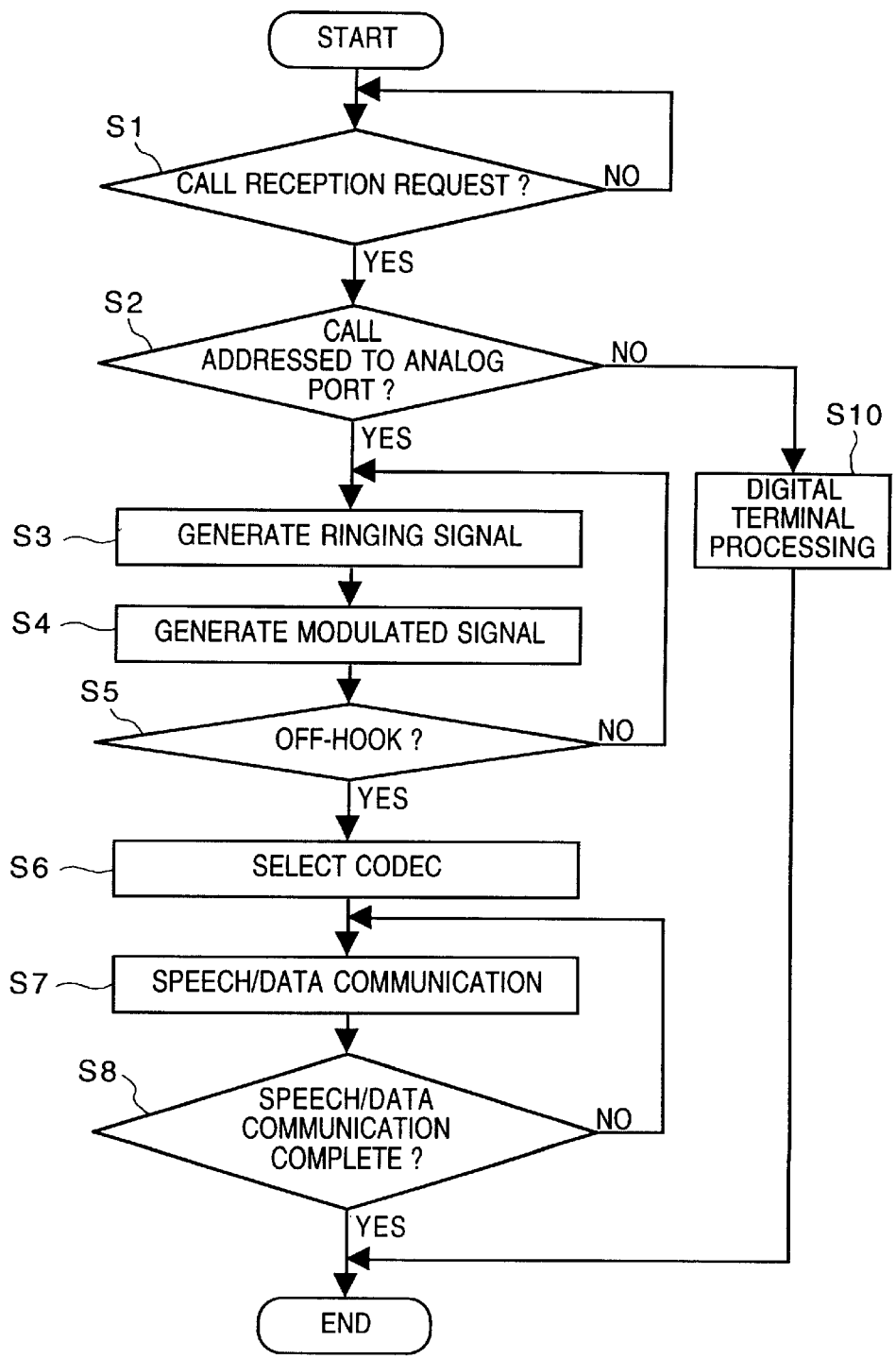
FIG. 3 is a flow chart showing the first operation of the TA which practices the present invention.
Figure 10:
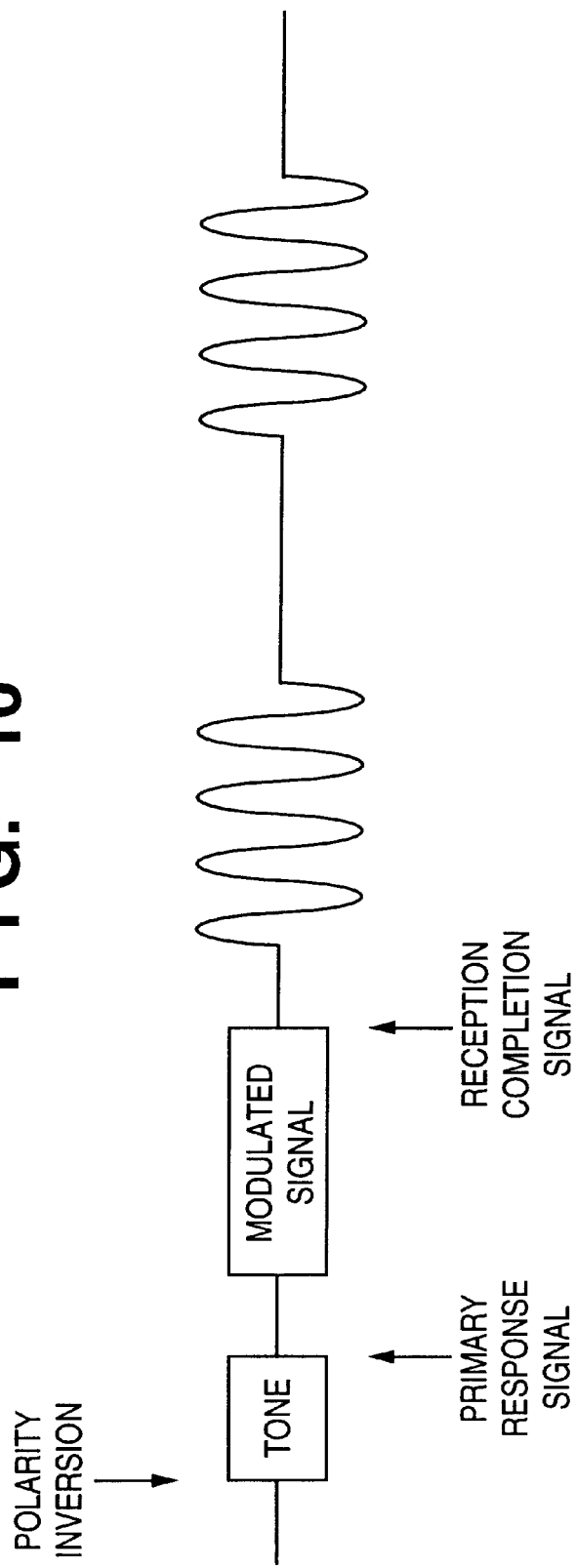
FIG. 10 is a view of a second ringing signal for notifying a calling party number.

In FIG. 9, Steps 3 and 4 are reversed to those in FIG. 3, and Steps 3A to 3C and Step 4A are added. Steps 1, 2, and 5 to 8 in FIG. 9 are the same as those in FIG. 3. FIG. 10 shows the modulated signal of the calling party number and the ringing signal in this case.

If connection to the analog port is determined in Step 2, the polarity of the connection line connected to the analog terminal is inverted in Step 3A. In Step 3B, a tone signal is sent from the signal generator 206 to the analog terminal. If a primary response signal from the analog terminal is detected in Step 3C, a modulated signal obtained by modulating the calling party number by the modem 207 is sent to the analog terminal.

The analog terminal connected to the analog terminal, which supports the calling party number notification function called, e.g., CDS (Caller Display Service), has a modem for demodulating the modulated signal and therefore can obtain the calling party number from the modulated signal. This analog terminal also has a function of sending the primary response signal upon receiving the tone signal in Step 3A and a function of sending a reception completion signal upon receiving the modulated signal in Step 4.

After completion of sending of the modulated signal, when the reception completion signal from the analog terminal is detected in Step 3C, the ringing signal is sent from the signal generator 206 to the analog terminal in Step 3. Upon detecting the off-hook state of the analog terminal in Step 5, the flow advances to Step 6.

The call reception operation of the analog terminal has been described above. Next, the origination operation of the analog terminal will be described.

When the analog terminal goes off-hook and receives a tone signal (e.g., DTMF: Dual Tone Multi Frequency) corresponding to the telephone number of the destination, the tone signal is interpreted by a modem or another circuit (not shown), and the number is sent to the CPU 201. The CPU 201 assembles an origination request control code containing the calling party number (the calling party number is the telephone number of the origination terminal and is registered in the memory 202 in correspondence with each analog port) of each analog port (connected to the origination terminal), or (if the calling party number corresponding to the calling terminal is not registered), the calling party number assigned to the entire TA 110, the above-described transfer capability and communication class and requests of the line side origination through the ISDN interface 203 and the line interface 200. When this request is received by the line side, an origination enable control code is returned from the line side. The CPU 201 receives this control code and sets the connection form for speech/data communication using the analog port so that speech communication or data communication with the FAX is enabled.

In this case, even when an analog terminal is connected to the TA 110, the network side can be notified of the calling party number assigned to this terminal or the TA 110. Therefore, if the other end system is a digital terminal, it can be notified of the transmitted calling party number.

In the above example, the signal generator is used to generate various analog signals to send them to the analog terminal. However, the present invention is not limited to this. For example, since a conventional modem can generate a tone signal, the modem can be used instead of the signal generator. The modem can also generate a ringing signal. In the above description, the TA has two digital ports and two analog ports. However, the present invention is not limited to this. In addition, the ISDN line has been exemplified as the digital line. However, the present invention can also be applied to another dedicated digit al line.

The operation program of the CPU 201 including the flow chart shown in FIG. 3 is stored in the memory 202 in advance. However, the program may be set and updated from a PC connected to the digital port 205 or a PC in a remote place through the ISDN. Alternatively, this program may be loaded from a disk memory (not shown) in a memory 302 upon powering on a private branch exchange 300.

Figure 5:
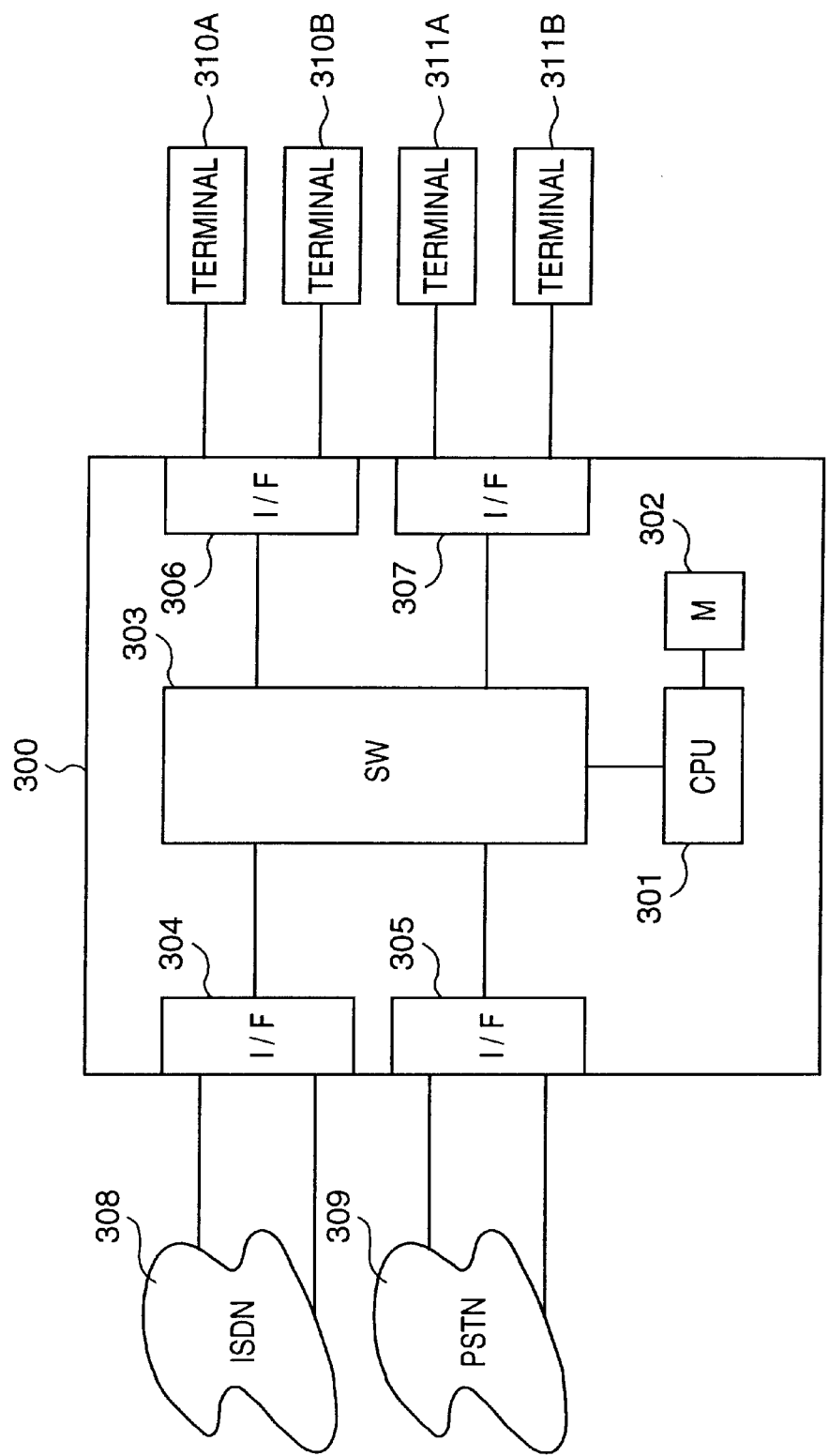
FIG. 5 is a block diagram showing the internal arrangement of a PBX which practices the present invention.

FIG. 5 is a block diagram showing the arrangement of the private branch exchange 300 which practices the present invention.

Reference numeral 304 denotes an ISDN (digital) line interface to which the subscriber line of an ISDN 308 is connected as an outside line. The ISDN line interface processes control data on the ISDN line. A PSTN line interface 305 is connected to the subscriber line of a PSTN 309 as an outside line and detects an incoming call from the PSTN 309 and makes an outgoing call to the PSTN 309.

A digital terminal interface 306 is connected to digital terminals 310A and 310B as extensions. An analog terminal interface 307 is connected to analog terminals 311A and 311B as extensions. The analog terminal interface 307 has the signal generator 206, the modem 207, and the codec 208 shown in FIG. 2 in correspondence with each of the analog terminals 311A and 311B. That is, when two analog terminals are connected, the analog terminal interface 307 has two sets of signal generators, modems, and codecs.

An exchange switch 303 connects the ISDN line interface 304, the PSTN line interface 305, the digital terminal interface 306, and the analog terminal interface 307 with each other.

Upon reception of an incoming call addressed to an analog terminal 311A or 311B from the ISDN 308, a CPU 301 performs the operation shown in FIG. 3 or 9. More particularly, it performs control in Steps 3 to 8 in FIG. 3 or control in Steps 3A to 8 in FIG. 9 for the analog terminal interface 307. In Step 6, the CPU 301 controls the exchange switch 303 to connect an analog terminal which has responded to the ISDN line that received the call. The memory 302 stores a program including the flow charts shown in FIGS. 3 and 9.

The operation program of the CPU 301, including the flow chart shown in FIG. 3, is stored in the memory 302 in advance. However, the program may be set and updated from a digital terminal connected to the digital terminal interface 306 or from a remote place through the ISDN 308. Alternatively, this program may be loaded from a disk memory (not shown) in the memory 302 upon powering on the private branch exchange 300.

The PSTN 309 need not always be connected to the private branch exchange 300 to realize the flow chart shown in FIG. 3. The digital terminal need not always be connected, either.

Figure 6:
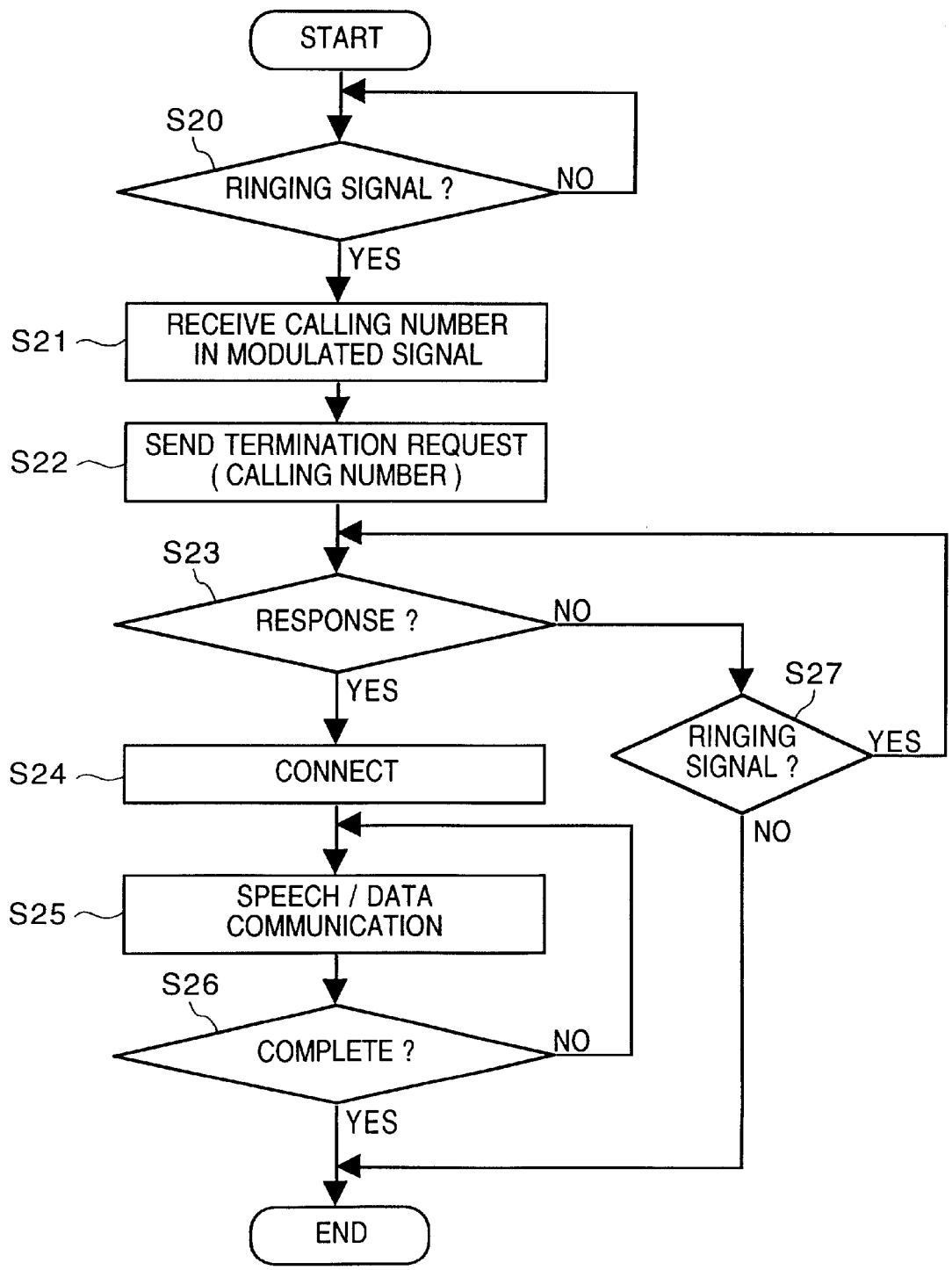
FIG. 6 is a flow chart showing the first operation of the PBX upon reception of an incoming call which practices the present invention.
Figure 11:
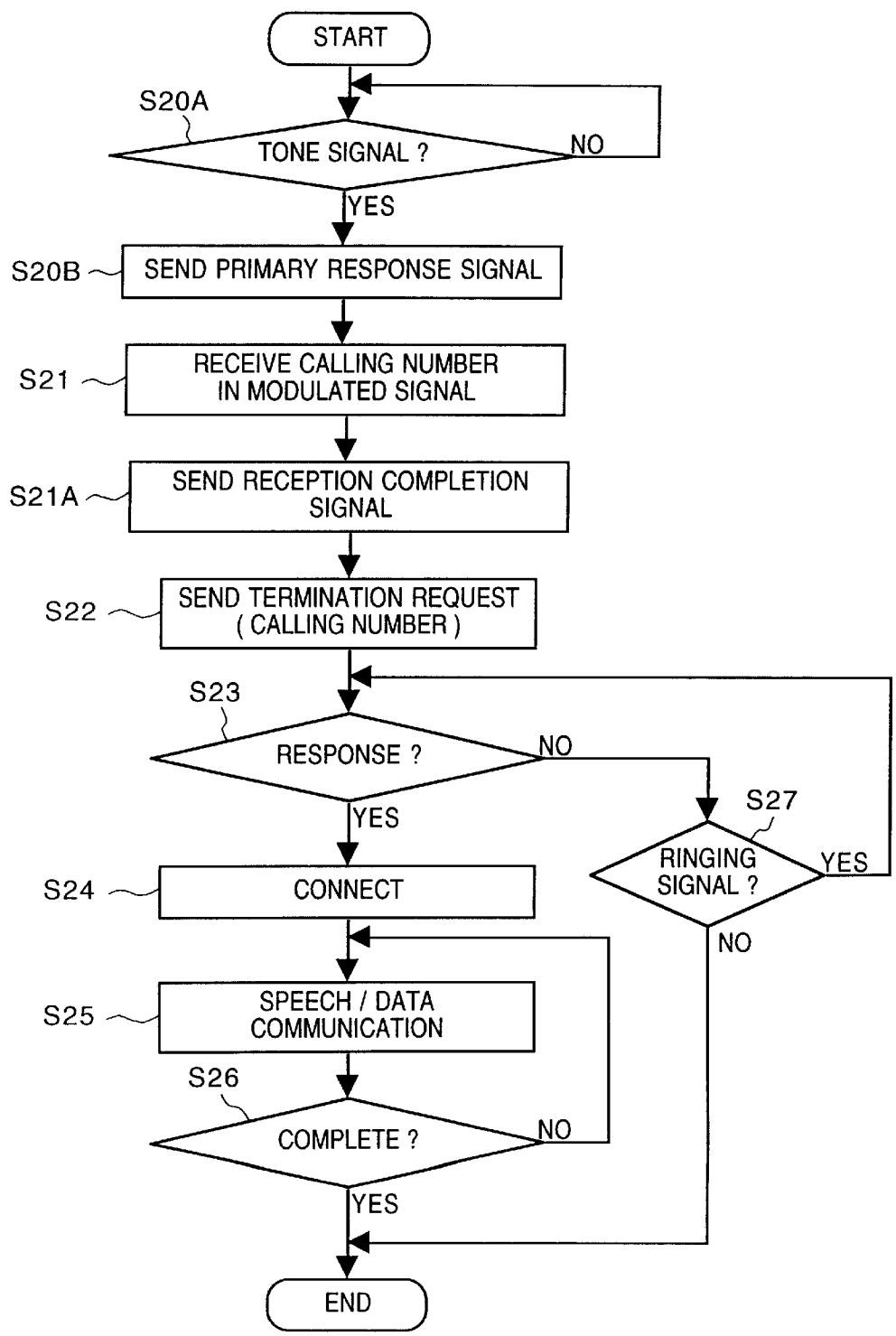
FIG. 11 is a flow chart showing the second operation of the PBX upon reception of an incoming call which practices the present invention.

An operation performed when the ringing signal shown in FIG. 4 or 10 is received from the PSTN 309 and a digital terminal 310A or 310B is notified of an incoming call addressed to itself will be described next with reference to the flow charts shown in FIGS. 6 and 11. The program including the flow charts in FIGS. 6 and 11 is stored in the memory 302 in advance. This program may be written and changed from the digital terminal 310A or 310B or from a remote place through the ISDN 308. Alternatively, the program may be loaded from a disk memory (not shown) in the memory 302 upon powering on the private branch exchange 300.

The memory 302 may store both programs shown in FIGS. 6 and 11 such that one of them can be selected, or may store one of these programs.

The PSTN line interface 305 has a ringing signal detection circuit and a modem for each PSTN line. That is, when two PSTN lines are connected, the PSTN line interface 305 has two sets of ringing signal detection circuits and modems. Upon detecting a ringing signal from the PSTN 309, the PSTN line interface 305 temporarily captures the PSTN line and demodulates the modulated signal received from the PSTN line to detect the calling party number (number of the caller).

The operation of the CPU 301 performed upon receiving the ringing signal shown in FIG. 4 will be described on the basis of the flow chart shown in FIG. 6.

In Steps 20 and 21, the CPU 301 is notified of reception of the ringing signal and the calling party number in the modulated signal received after the ringing signal from the PSTN 309. The CPU 301 instructs the digital terminal interface 306 to send a call reception request code containing the calling party number notified in Step 21 to the digital terminal 310A or 310B (Step 22).

If the digital terminal 310A is an ISDN terminal like the digital terminal connected to the digital port 216 shown in FIG. 2, the digital terminal interface 306 sends a setup code containing the calling party number which has been received as the modulated signal shown in FIG. 4 after the ringing signal from the PSTN 309 to the digital terminal 310A through the control channel (D channel).

Under the control of the CPU 301, the digital terminal interface 306 sets the transfer capability of the setup code as "speech" and the communication class as "telephone". When a specific PSTN line is dedicated for a G3-FAX (when the other party is notified of it in advance), the digital terminal interface 306 sets the transfer capability of the setup code as "3.1-kHz audio" and the communication class as "G3/G2FAX".

The CPU 301 determines whether the digital terminal 310A or 310B responds to the setup code, or the caller side aborts origination and the PSTN 309 ceases to send the ringing signal (Steps 23 and 27). If the ringing signal stops in Step 27, i.e., if the next ringing signal is not detected after the elapse of the period Tf in FIG. 4 (this also applies to FIG. 10), the digital terminal 310A or 310B is notified of disconnection on the caller side through the digital terminal interface 306.

If the digital terminal 310A or 310B has responded in Step 23, the ISDN 308 is notified of the response on the called party side by the CPU 301 through the ISDN interface 304. The CPU 301 controls the exchange switch 303 to connect the ISDN line at which the call has arrived to the digital terminal which has responded to the call (Step 24).

The speech/data communication state is set (Step 25). Upon detecting completion of the speech/data communication (Step 26), the processing is ended.

The operation of the CPU 301 performed when the ringing signal shown in FIG. 10 is received will be described next with reference to the flow chart shown in FIG. 11.

Processing from step 22 in the flow chart in FIG. 11 is the same as that in FIG. 6.

When inversion of the polarity of the subscriber line of the PSTN 309 and the tone signal are detected by the PSTN line interface 305 in Step 20A, the CPU 301 sends a primary response signal to the PSTN 309 through the PSTN line interface 305 in Step 20B.

In Step 21, the CPU 301 demodulates the modulated signal sent from the PSTN 309 and receives the calling party number. In Step 21A, the CPU 301 sends a reception completion signal to the PSTN 309 through the PSTN line interface 305, and the flow advances to Step 22.

Processing from Step 22 is the same as that shown in FIG. 6.

The ISDN 308 need not always be connected to the private branch exchange 300 to realize the flow chart shown in FIG. 6 or 11. The analog terminal need not always be connected, either.

Figure 7:
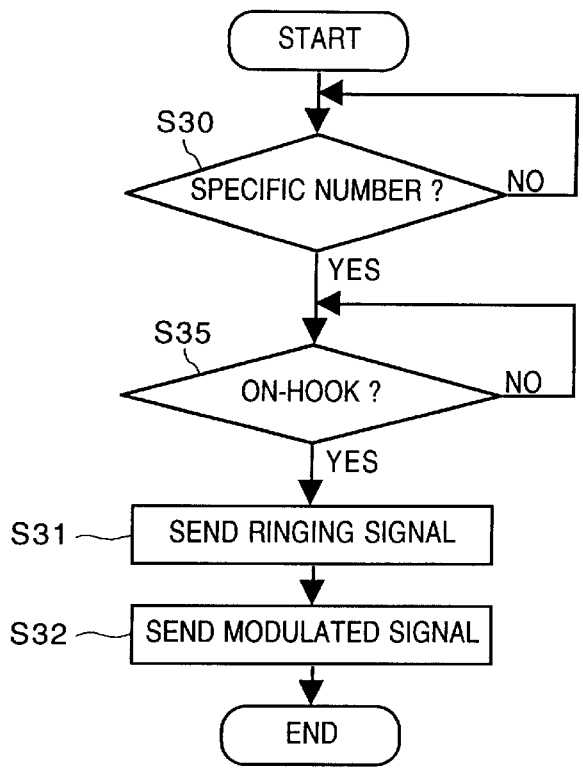
FIG. 7 is a flow chart showing the first operation in inputting a specific number from the analog terminal of the PBX which practices the present invention.

Control of the CPU 301 of the private branch exchange 300 as an analog terminal connection apparatus when information corresponding to the analog terminal 311A is to be sent to the analog terminal 311A that receives the ringing signal in FIG. 4 and displays the calling party number will be described next with reference to the flow chart shown in FIG. 7. The program including the flow chart in FIG. 7 is stored in the memory 302 in advance. This program may be written and changed from the digital terminal 310A or 310B or from a remote place through the ISDN 308. Alternatively, the program may be loaded from a disk memory (not shown) in the memory 302 upon powering on the private branch exchange 300.

As described above, the analog terminal 311A has a function of receiving an analog signal modulated according to the calling party number, which is received between ringing signals, upon receiving the ringing signal shown in FIG. 4 from the network (PSTN), and displaying the calling party number.

In the example shown in FIG. 7, the digital terminal 310A or 310B need not always be connected to the private branch exchange 300. In addition, one of the ISDN 308 and PSTN 309 need not be connected to the private branch exchange 300.

When a predetermined specific number is input from the analog terminal 311A, the analog terminal interface 307 receives a dial signal corresponding to the specific number in Step 30, and the flow advances to Step 35.

If the analog terminal interface 307 detects in Step 35 that the analog terminal 311A has gone on-hook, the CPU 301 controls the analog terminal interface 307 in Steps 31 and 32 to send a ringing signal to the analog terminal 311A and sends an analog signal modulated according to information corresponding to the analog terminal 311A.

The analog signal to be sent in Step 32 is modulated by the same modulation scheme as that used to transfer the calling party number between ringing signals shown in FIG. 4.

Therefore, the analog terminal 311A can demodulate the information corresponding to the analog terminal and display the information, like the calling party number.

The CPU 301 may repeat processing in Steps 31 and 32 until the analog terminal 311A goes off-hook. Alternatively, the processing of sending the information corresponding to the analog terminal 311A may be ended after processing in Steps 31 and 32 is executed once, or repeatedly performed a predetermined number of times (two to three times). In this arrangement, excessive ring-back tone generation can be prevented.

Figure 12:
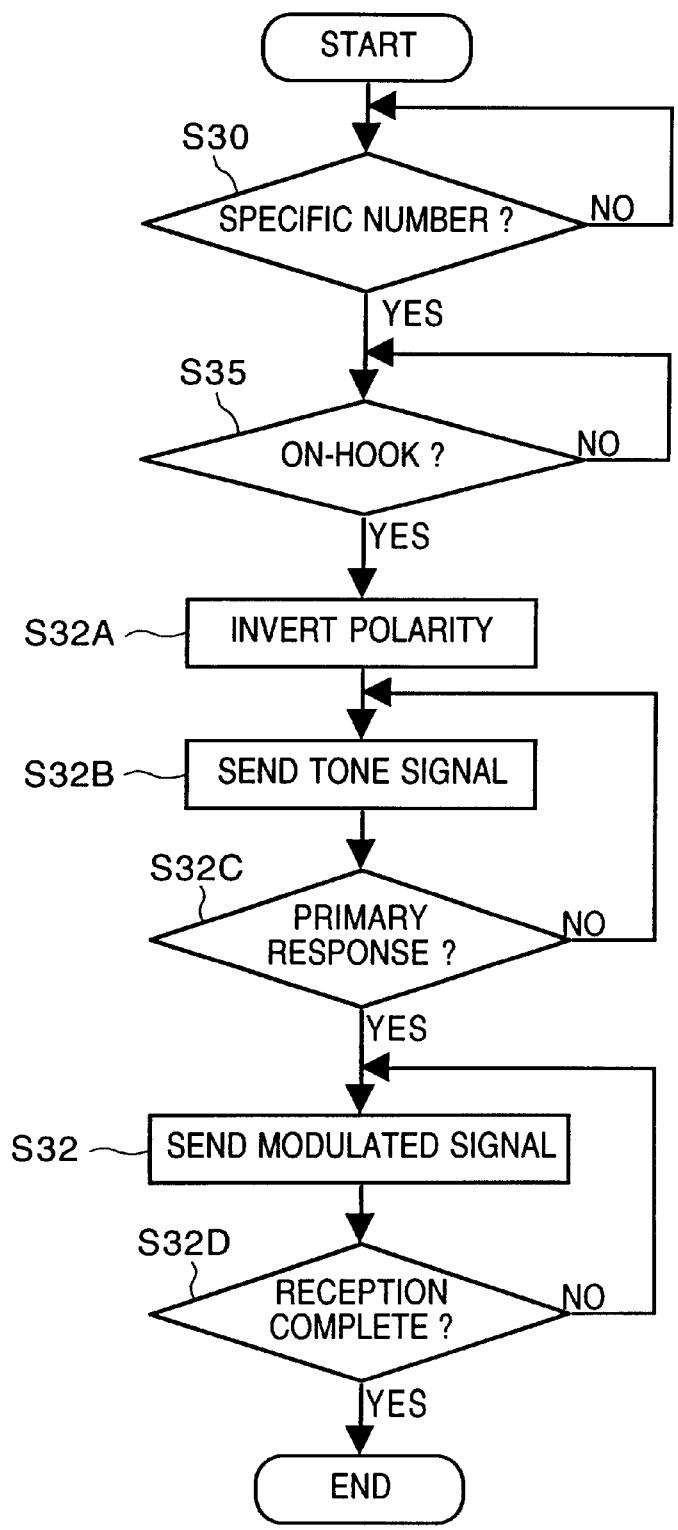
FIG. 12 is a flow chart showing the second operation in inputting a specific number from the digital terminal of the PBX which practices the present invention.

When information corresponding to an analog terminal that receives the ringing signal shown in FIG. 10 and displays the calling party number is to be sent to the analog terminal, the CPU 301 operates according to the flow chart shown in FIG. 12. The program including the flow chart in FIG. 12 is stored in the memory 302 in advance. This program may be written and changed from the digital terminal 310A or 310B or from a remote place through the ISDN 308. Alternatively, the program may be loaded from a disk memory (not shown) in the memory 302 upon powering on the private branch exchange 300. The memory 302 may store both programs shown in FIGS. 7 and 11 such that one of them can be selected, or may store one of these programs.

Processing in Steps 30 and 35 in FIG. 12 is the same as that in FIG. 7. Upon detecting in Step 35 through the analog terminal interface 307 that the analog terminal 311A has gone on-hook, the CPU 301 controls the analog terminal interface 307 to invert the polarity of the connection line to the analog terminal 311A in Step 32A and send a tone signal to the analog terminal 311A in Step 32B. Upon detecting the primary response signal from the analog terminal 311A, the CPU 301 sends an analog signal modulated according to the information corresponding to the analog terminal 311A in Step 32.

The analog signal to be sent in Step 32 is modulated by the same modulation scheme as that used to transfer the calling party number before the ringing signal shown in FIG. 10.

Therefore, the analog terminal 311A can demodulate the information corresponding to the analog terminal and display the information, like the calling party number.

The ringing signal need not be sent next to Step 32D. In addition, detection of the reception completion signal in Step 32D may be omitted.

In the above description, processing in FIG. 7 or 12 is executed by the private branch exchange 300 shown in FIG. 5 as an analog terminal connection apparatus. However, this processing may be executed by the terminal adapter 110 shown in FIG. 2.

Figure 8:
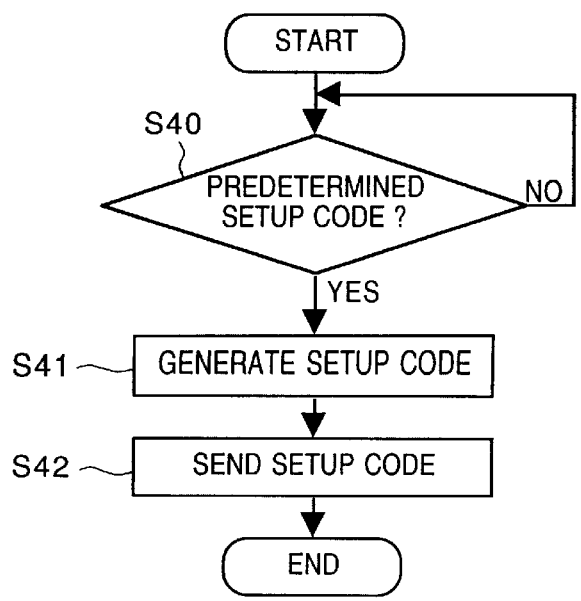
FIG. 8 is a flow chart showing operation performed when a predetermined setup code is received from the digital terminal of the PBX which practices the present invention.

Control of the CPU 301 of the private branch exchange 300 as a digital terminal connection apparatus when information corresponding to the digital terminal 310A is to be sent to the digital terminal 310A will be described next with reference to the flow chart shown in FIG. 8. The program including the flow chart in FIG. 8 is stored in the memory 302 in advance. This program may be written and changed from the digital terminal 310A or 310B or from a remote place through the ISDN 308. Alternatively, the program may be loaded from a disk memory (not shown) in the memory 302 upon powering on the private branch exchange 300.

The digital terminal 310A has a function of receiving a setup code as a call reception request code from the ISDN 308 and displaying the calling party number contained in the received code.

In the example shown in FIG. 8, the analog terminal 311A or 311B need not always be connected to the private branch exchange 300.

Upon receiving a predetermined setup code (e.g., the calling party number contained in the setup code has a predetermined value) from the digital terminal 310A through the digital terminal interface 306 (Step 40), the CPU 301 controls the digital terminal interface 306 to prepare a setup code containing information corresponding to the digital terminal 310A as a calling party number (Step 41) and send the setup code in which the information corresponding to the digital terminal 310A is inserted in the calling party number field to the digital terminal 310A.

The information corresponding to the analog or digital terminal, which is sent in place of the calling party number, is information unique to the analog or digital terminal (more specifically, information of the connected terminal or extension number). Alternatively, it is information representing the use result or record of the analog or digital terminal (more specifically, communication charge information or communication time information) or, e.g., limitation information (more specifically, destination limitation information, user limitation information, or call limitation upon reception of an incoming call). The call limitation upon reception of an incoming call is information representing whether the terminal is to be called or not depending on the caller or called party information or information such as a communication attribute detected upon reception of an incoming call. In other words, it is information representing whether the terminal is to be called upon reception of an incoming call, which is set in advance. These information are stored in the memory 302 in correspondence with each calling analog or digital terminal.

Since the analog or digital terminal displays this information as the calling party number, this information can be displayed at the analog or digital terminal.

As many apparently widely different embodiments of the present invention can be made without departing from the spirit and scope thereof, it is to be understood that the invention is not limited to the specific embodiments thereof except as defined in the appended claims.

What is claimed is:

1. A connection apparatus for connecting a digital subscriber line of a communication network to a communication device, comprising:

connection means for connecting the communication device;

reception means for connecting the digital subscriber line of the communication network and receiving a digital incoming call signal from the communication network; and conversion means for converting calling party information included in the digital incoming call signal into an analog signal, wherein said conversion means sends the analog signal converted from the calling party information to the communication device in a procedure of calling the communication device.

2. The apparatus according to claim 1, wherein said conversion means sends the analog signal converted from the calling party information to the communication device before the sending of a ringing signal is complete.

3. The apparatus according to claim 1, wherein said conversion means sends the analog signal converted from the calling party information to the communication device during an OFF period of a ringing signal.

4. The apparatus according to claim 1, wherein said conversion means sends an analog modulated signal modulated by the calling party information to the communication device.

5. The apparatus according to claim 1, wherein said conversion means sends the analog signal converted from the calling party information included in a setup signal received from an ISDN as the digital communication network to the communication device.

6. A method of controlling a connection apparatus for connecting a digital subscriber line of a communication network to a communication device, comprising the steps of:

receiving a digital incoming call signal from the communication network; and converting calling party information included in the digital incoming call signal into an analog signal, wherein the conversion step includes sending the analog signal converted from the calling party information to the communication device in a procedure of calling the communication device.

7. The method according to claim 6, wherein the conversion step includes a step of sending the analog signal converted from the calling party information to the communication device before the sending of a ringing signal is complete.

8. The method according to claim 6, wherein the conversion step includes a step of sending the analog signal converted from the calling party information to the communication device during an OFF period of a ringing signal.

9. The method according to claim 6, wherein the conversion step includes a step of sending an analog modulated signal modulated by the calling party information to the communication device.

10. The method according to claim 6, wherein the conversion step includes a step of sending the analog signal converted from the calling party information included in a setup signal received from an ISDN as the digital communication network to the communication device.

11. A storage medium which stores a control program for a connection apparatus for connecting a digital subscriber line of a communication network to a communication device, said storage medium storing:

reception means for receiving a digital incoming call signal from the communication network; and conversion means for converting calling party information included in the digital incoming call signal into an analog signal, wherein said conversion means sends the analog signal converted from the calling party information to the communication device in a procedure of calling the communication device.

12. The medium according to claim 11, wherein said conversion means sends the analog signal converted from the calling party information to the communication device before the sending of a ringing signal is complete.

13. The medium according to claim 11, wherein said conversion means sends the analog signal converted from the calling party information to the communication device during an OFF period of a ringing signal.

14. The medium according to claim 11, wherein said conversion means sends an analog modulated signal modulated by the calling party information to the communication device.

15. The medium according to claim 11, wherein said conversion means sends the analog signal converted from the calling party information included in a setup signal received from an ISDN as the digital communication network to the communication device.

16. A terminal adapter apparatus for connecting a digital terminal to a digital line, comprising:

digital connecting means for connecting the digital terminal;

analog connecting means for connecting an analog terminal;

receiving means for receiving a digital incoming call signal from the digital line, the digital incoming call signal includes calling party information;

ringing signal sending means for sending a ringing signal to the analog terminal in accordance with said receiving means, the ringing signal is sent in a ringing on period; and analog signal sending means for sending an analog signal modulated by the calling party information included in the digital incoming call signal, the analog signal is sent in a ringing off period when the ringing signal is not sent.

17. The apparatus according to claim 16, wherein said analog connecting means includes selecting means for selecting one of said ringing signal sending means and said analog signal sending means such that the ringing signal is sent to the analog terminal in the ringing on period and the analog signal is sent to the analog terminal in the ringing off period.

18. The apparatus according to claim 16, wherein the ringing signal and the analog signal are sent by said ringing signal sending means and said analog signal sending means when the digital incoming signal for the analog terminal is received by said receiving means.

19. The apparatus according to claim 16, wherein said receiving means judges whether the incoming call signal is for the digital terminal or the analog terminal.

20. The apparatus according to claim 16, wherein said analog connecting means includes converting means for performing conversing between an analog signal and a digital signal for enabling conversation with a partner.

21. A method for controlling a terminal adapter apparatus which connects a digital terminal and an analog terminal to a digital line, comprising the steps of:

receiving a digital incoming call signal from the digital line, the digital incoming call signal includes calling party information;

sending a ringing signal to the analog terminal in accordance with said receiving step, the ringing signal is sent in a ringing on period; and sending an analog signal modulated by the calling party information included in the digital incoming call signal, the analog signal is sent in a ringing off period when the ringing signal is not sent.

22. The method according to claim 21, wherein the ringing signal and the analog signal are sent from a modulator.

23. The method according to claim 21, wherein one of a ringing signal generator and a modulator is selected such that the ringing signal is sent by the ringing signal generator to the analog terminal in the ringing on period and the analog signal is sent by the modulator to the analog terminal in the ringing off period.

24. The method according to claim 21, wherein the ringing signal and the analog signal are sent when the digital incoming signal for the analog terminal is received in said receiving step.

25. The method according to claim 21, wherein whether the incoming call signal is for the digital terminal or the analog terminal is judged in said receiving step.

26. The method according to claim 21, wherein the analog terminal is connected to a codec for enabling conversation with a partner when the analog terminal responds to the ringing signal.

27. A storage medium for storing a program for controlling a terminal adapter apparatus which connects a digital terminal and an analog terminal to a digital line, the program comprising the steps of:

receiving a digital incoming call signal from the digital line, the digital incoming call signal includes calling party information;

sending a ringing signal to the analog terminal in accordance with said receiving step, the ringing signal is sent in a ringing on period; and sending an analog signal modulated by the calling party information included in the digital incoming call signal, the analog signal is sent in a ringing off period when the ringing signal is not sent.

28. The medium according to claim 27, wherein the ringing signal and the analog signal are sent from a modulator.

29. The medium according to claim 27, wherein one of a ringing signal generator and a modulator is selected such that the ringing signal is sent by the ringing signal generator to the analog terminal in the ringing on period and the analog signal is sent by the modulator to the analog terminal in the ringing off period.

30. The medium according to claim 27, wherein the ringing signal and the analog signal are sent when the digital incoming signal for the analog terminal is received in said receiving step.

31. The medium according to claim 27, wherein whether the incoming call signal is for the digital terminal or the analog terminal is judged in said receiving step.

32. The medium according to claim 27, wherein the analog terminal is connected to a codec for enabling conversation with a partner when the analog terminal responds to the ringing signal.

33. A terminal adapter apparatus for connecting a digital terminal to a digital line, comprising:

digital connecting means for connecting the digital terminal;

analog connecting means for connecting an analog terminal; and receiving means for receiving a digital incoming call signal from the digital line, the digital incoming call signal includes calling party information, wherein said analog connecting means sends a ringing signal to the analog terminal in accordance with said receiving means, the ringing signal is sent in a ringing on period, and said analog connecting means sends an analog signal modulated by the calling party information included in the digital incoming call signal, the analog signal is sent in a ringing off period when the ringing signal is not sent.

34. The apparatus according to claim 33, wherein said analog connecting means includes a modulator for sending the ringing signal and the analog signal.

35. The apparatus according to claim 33, wherein said analog connecting means includes selecting means for selecting one of a ringing signal generator and an analog signal generator such that the ringing signal is sent to the analog terminal in the ringing on period and the analog signal is sent to the analog terminal in the ringing off period.

36. The apparatus according to claim 33, wherein the ringing signal and analog signal are sent by said analog connecting means when the digital incoming signal for the analog terminal is received by said receiving means.

37. The apparatus according to claim 33, wherein said receiving means judges whether the incoming call signal is for the digital terminal or the analog terminal.

38. The apparatus according to claim 33, wherein said analog connecting means includes converting means for performing conversing between an analog signal and a digital signal for enabling conversation with a partner.

* * * * *

UNITED STATES PATENT AND TRADEMARK OFFICE
CERTIFICATE OF CORRECTION

PATENT NO.    : 6,215,868 B1
DATED         : April 10, 2001
INVENTOR(S)   : Yutaka Inoue It is certified that error appears in the above-identified patent and that said Letters Patent is hereby corrected as shown below:

Title page,
Item [56], References Cited, FOREIGN PATENT DOCUMENTS,
"4-233647     8/1992  (JP)" should read
-- 4-223647   8/1992  (JP) --
The following should be inserted: -- JPA5-145638  Abstract   6/1993 --

Column 8,
Line 19, "digit al line." should read -- digital line. --

Signed and Sealed this

Thirteenth Day of August, 2002

Attest:

Attesting Officer

JAMES E. ROGAN
*Director of the United States Patent and Trademark Office*